June 19, 1962 J. G. SCHWARCKOPF ETAL 3,040,249
LOW VOLTAGE TESTER
Filed Oct. 1, 1958
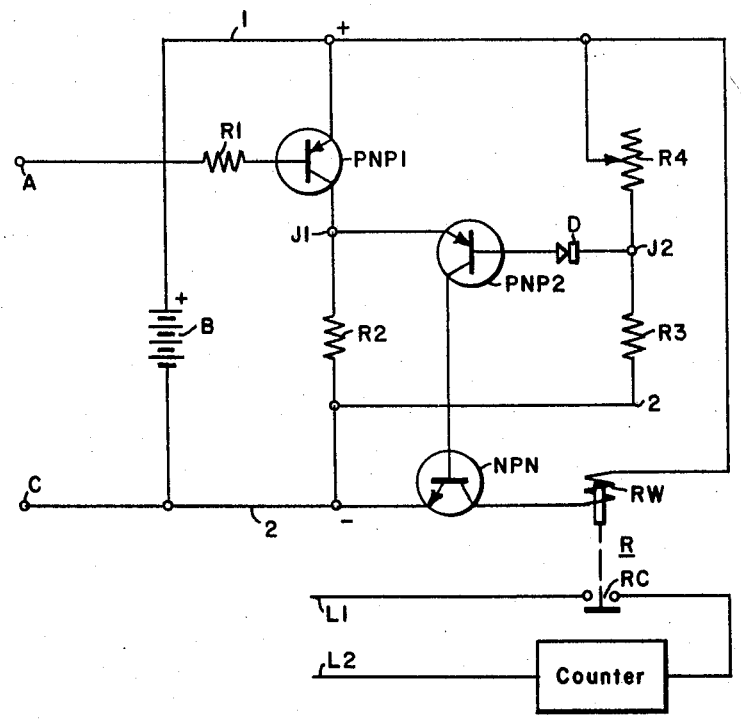
WITNESSES
John E. Healey, Jr.
James F. Young
INVENTORS
Joseph G. Schwarckopf &
Karl R. Humes.
BY
Paul E. Friedesmann
ATTORNEY 3,040,249
LOW VOLTAGE TESTER
Joseph G. Schwarckopf, Eggertsville, and Karl R. Humes,
Buffalo, N.Y., assignors to Westinghouse Electric
Corporation, East Pittsburgh, Pa., a corporation of
Pennsylvania
Filed Oct. 1, 1958, Ser. No. 764,684
2 Claims. (Cl. 324—54)

This invention relates to testing devices and more particularly to testing devices for determining the electric insulating characteristics of materials.

Insulation testing devices are well known in the prior art but such devices employ high voltages. The need for the use of high voltages arises from the fact that the sensitivity of the controls used is poor. The use of high voltage can be destructive and in some cases, where there is a fire hazard, cause fires. Further, the use of a high voltage is usually destructive of the test piece.

One broad object of this invention is the provision of insulating testing means using low voltage and operative to conduct the tests without destruction of the test piece.

Another broad object of this invention is the provision of highly sensitive yet reliable means for testing the insulation properties of insulating material.

A more specific object of this invention is the use of transistor circuitry to test the insulating properties of insulating material.

Other objects and advantages will become more apparent from a study of the following specification and accompanying drawing, in which the single FIGURE is a diagrammatic showing of the low voltage insulation tester using transistors.

In the figure, B represents a low voltage battery for supplying a positive potential of say 24 volts to lead 1 and a negative voltage to lead 2, which negative voltage may be considered a zero voltage, and lead 2 may be considered a grounded conductor.

Terminals A and C are the terminals to be applied to the insulating material to be tested. The terminal A is, through the resistor R1, connected to the base of transistor PNP1.

It will be noted that the transistor PNP1 and resistors R2, R3 and R4 form a bridge circuit with the supply leads 1 and 2 providing energization for the bridge. The resistors R2 and R3 are selected to have a constant resistance value, while resistor R4 is made adjustable giving greater or less sensitivity, as desired.

When the insulating properties of the insulating material is at the proper value transistor PNP1 is non-conducting and the bridge is balanced.

The base of transistor PNP2 is, through diode D, connected to junction J2 and the emitter of transistor PNP2 is connected to junction J1. The junctions J1 and J2 are the balanced voltage points when the insulating property of the insulation material disposed between the probes, or terminals A and C is at the proper value. Both transistors PNP1 and PNP2 are thus nonconducting.

When there is a defect in the insulation between probes A and C a small current flows between A and C. The transistor PNP1 becomes conducting and thus unbalances the bridge.

The potential across junctions J1 and J2 so changes that transistor PNP2 becomes conducting. Conduction of transistor PNP2 so changes the voltage on the base of transistor NPN in relation to the emitter and collector of this transistor that it becomes conducting to thus establish an energizing circuit for the relay winding RW of relay R. The relay R thus picks up to close the relay contacts RC.

Leads L1 and L2 are energized from a suitable alternating-current source usually available. The supply may have any selected voltage. The counter thus actuates to indicate an insulation defect.

In the preferred use one probe, as the probe C, would be connected to the machine base and the other probe A would, through a wet sponge, be connected to contact the enamel, varnish, paper, rubber, etc., applied to a conducing metal strip, wire or sheet, or other material, as the case may be, that is moved along between the probes. Each time an insulation defect is encountered the counter is operated to count the defects.

The counter may also operate a signal and/or marker to mark the material at the place where the defect is encountered by the probes.

From the foregoing it is apparent that very much lower voltage is needed for a highly sensitive means for testing insulation and that no destructive effect whatsoever is produced on the test piece.

The invention has been shown and described with reference to one embodiment. The invention is, however, not limited to the one embodiment but includes all other modifications falling within the spirit and scope of this invention.

We claim as our invention:

1. In an electric system of circuitry for detecting defects in electric insulating material, in combination, a pair of leads energized with a relatively low constant voltage direct current, a normally balanced bridge circuit including a transistor in one leg, two constant impedance impedance means in two of the other legs, and an adjustable impedance impedance means in the third leg, connected across said leads, an impedance means having one terminal connected to the base of the transistor and its other terminal connected to one probe terminal, a second probe terminal connected on one of the leads, said probes in use are disposed across the insulating material to be investigated for defects, the defects causing a current to flow between the probes to effect conduction of the transistor whereby the bridge circuit becomes unbalanced, a diode, a second transistor having its emitter connected to the collector of the first transistor and also to the first normally neutral junction of the bridge and having its base connected through the diode to the second neutral junction of the bridge, whereby the unbalance of the bridge causes the conduction of both transistors, and means responsive to the conduction of both transistors for indicating the presence of a defect in the insulating material disposed between the probes.

2. In an electric system of circuitry for detecting defects in electric insulating material, in combination, a pair of leads energized with a relatively low constant voltage direct current, a normally balanced bridge circuit including a transistor in one leg, two constant impedance impedance means in two of the other legs, and an adjustable impedance impedance means in the third leg, connected across said lead, an impedance means having one terminal connected to the base of the transistor and its other terminal connected to one probe terminal, a second probe terminal connected on one of the leads, said probes in use are disposed across the insulating material to be investigated for defects, the defects causing a current to flow between the probes to effect conduction of the transistor whereby the bridge circuit becomes unbalanced, a diode, a second transistor having its emitter connected to the collector of the first transistor and also to the first normally neutral junction of the bridge and having its base connected through the diode to the second neutral junction of the bridge, whereby the unbalance of the bridge causes the conduction of both transistors, a third transistor having its base connected to the collector of the second transistor, a load unit, said third transistor having its emitter and collector connected in series with the load unit across said two leads, said load unit producing an indication each time the bridge circuit becomes unbalanced to effect the conduction of all three transistors.

References Cited in the file of this patent

UNITED STATES PATENTS

| | | |
|---|---|---|
| 2,379,955 | Eilenberger | July 10, 1945 |
| 2,696,739 | Endres | Dec. 14, 1954 |
| 2,799,013 | Langer | July 9, 1957 |
| 2,841,765 | Harrold | July 1, 1958 |
| 2,901,740 | Cutsogeorge | Aug. 25, 1959 |
| 2,916,697 | Boode | Dec. 8, 1959 |

FOREIGN PATENTS

| | | |
|---|---|---|
| 794,258 | Great Britain | Apr. 30, 1958 |
| 797,542 | Great Britain | July 2, 1958 |

OTHER REFERENCES

Garner: "Radio and Television News," September 1954; pages 52, 53, and 98.